United States Patent Office 2,799,625
Patented July 16, 1957

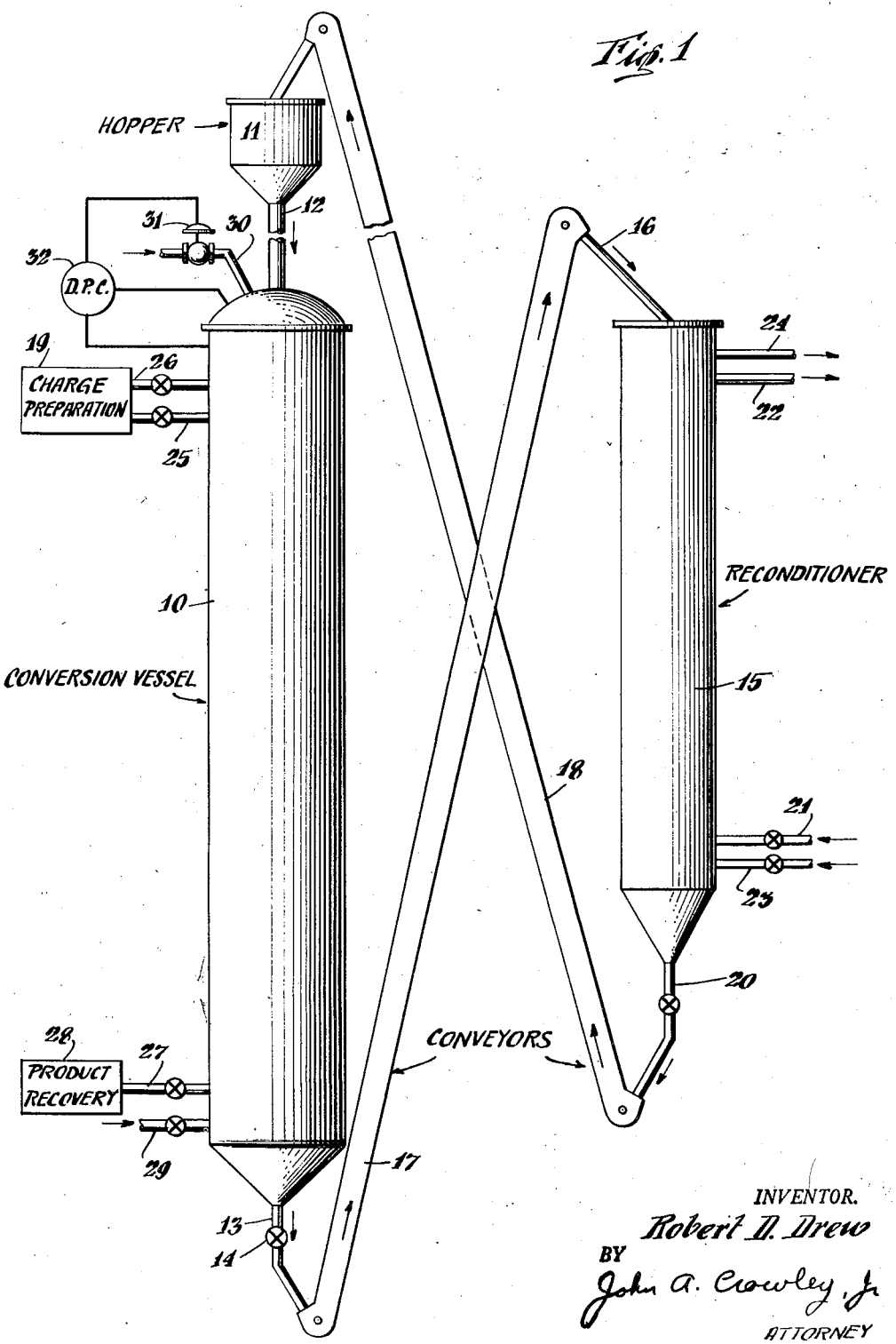

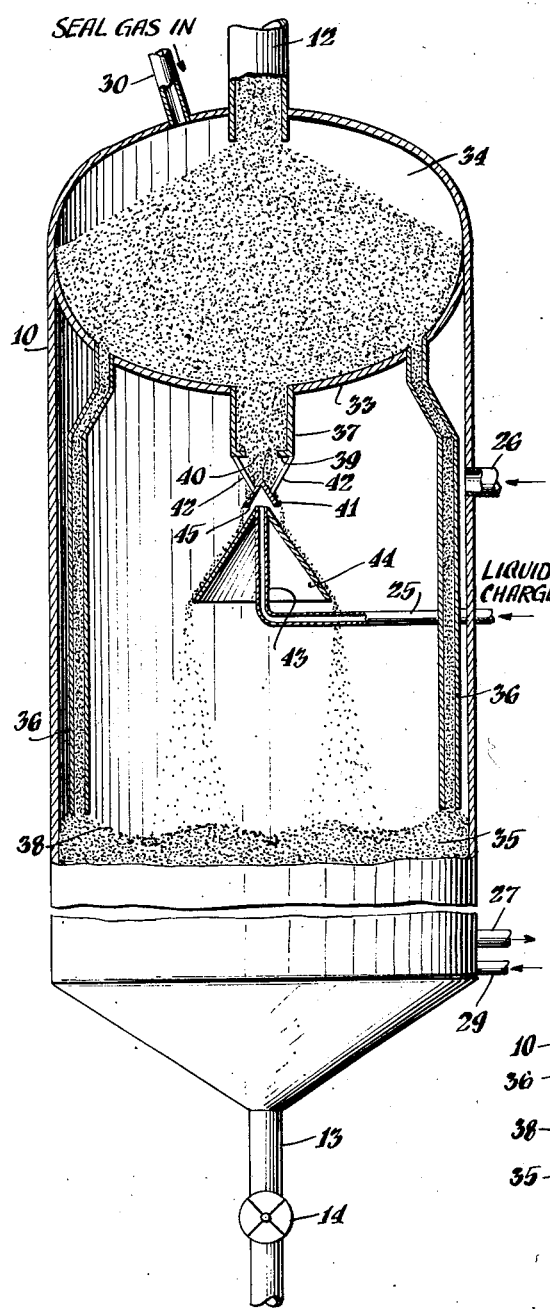
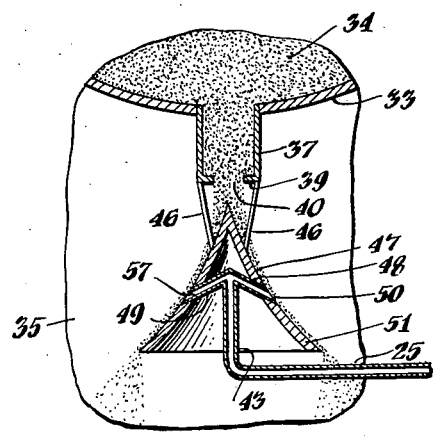
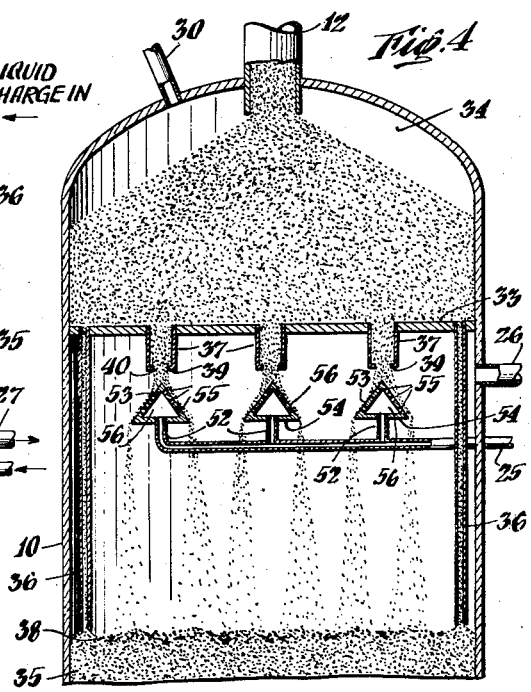

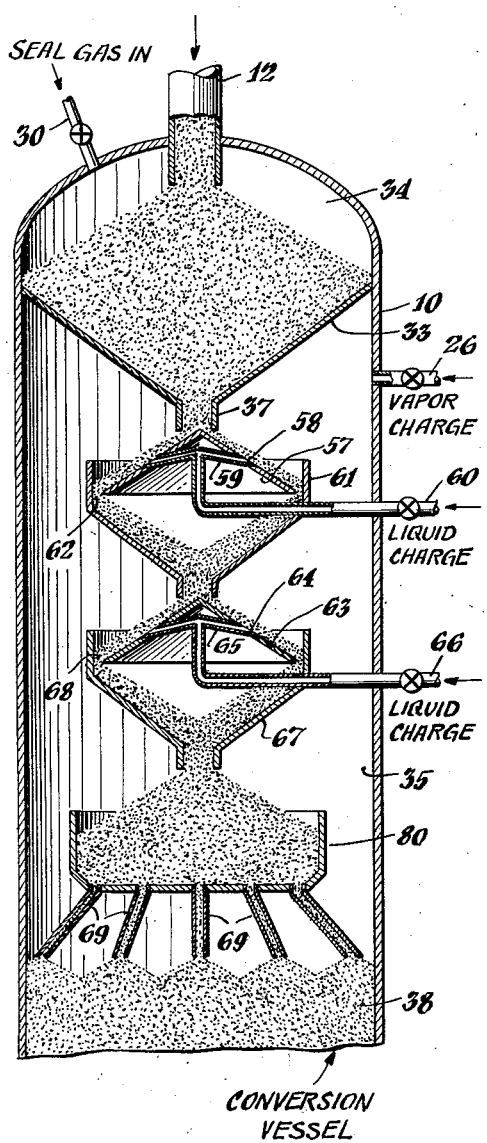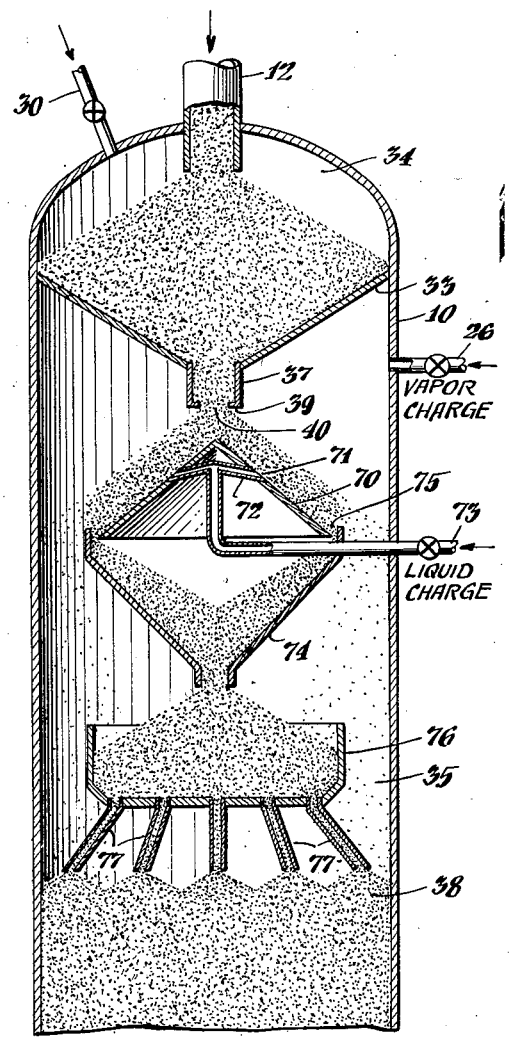

2,799,625

METHOD AND APPARATUS FOR THE CONVERSION OF LIQUID HYDROCARBONS

Robert D. Drew, Wenonah, N. J., assignor to Socony Mobil Oil Company, Inc., a corporation of New York Application July 18, 1951, Serial No. 237,405

15 Claims. (Cl. 196—52)

This invention has to do with a method and apparatus for the conversion of high boiling hydrocarbons or mixed phase hydrocarbons to lower boiling hydrocarbons in the presence of a moving, particle-form contact material mass which may or may not exhibit catalytic properties with respect to the conversion reaction. Particularly, this invention is concerned with an improved method and apparatus for the introduction of liquid hydrocarbon charge and contact material into the conversion zone.

Typical of processes to which this invention may be applied is the catalytic conversion of heated liquid hydrocarbons to lower boiling gasoline containing gaseous hydrocarbon products by passing said liquid hydrocarbons through a conversion zone at a temperature of about 850° F. together with a cyclically moving compact column of particle-form adsorbent catalytic material. Used catalytic material is reconditioned for reuse in the conversion zone by passing it through a reconditioning zone wherein the carbonaceous contaminants deposited on said catalytic material during the hydrocarbon conversion are burned off by means of a fluid regenerating medium such as an oxygen containing gas. Other exemplary processes are the thermal visbreaking, coking or cracking of liquid or mixed phase hydrocarbon charge by contact with heated particle-form inert contact materials.

In processes wherein the contact material is catalytic in nature it may partake of the nature of natural or treated clays, bauxite, activated alumina or synthetic associations of silica, alumina or silica and alumina to which other substances such as certain metallic oxides may be added in small amounts for specific purposes. When the contact material is inert in character it may partake of the form of refractory materials such as zirkite, corhart material, or mullite or it may partake of the form of stones or metallic particles or balls. It is desirable to maintain the contact material particles within the size range about 3 to 100 mesh and preferably within the range about 4 to 20 mesh by Tyler standard screen analysis. While operation may be obtained using contact material particles of a size outside these ranges such operation is inferior.

In charging liquid hydrocarbons to a hydrocarbon conversion zone it is necessary that the liquid charge be introduced in such a manner that the liquid is distributed uniformly over the entire contact material column cross-section within said conversion zone. If the liquid hydrocarbons are simply sprayed onto the surface of the contact material column there is a marked tendency for channeling because of non-uniform particle size distribution in the bed or irregular bed surface, etc., consequently, the liquid-contact material contacting is non-uniform with resultant over-conversion of a portion of the hydrocarbons, underconversion of the remaining portion and very uneven carbonaceous contaminant distribution on the used contact material. Also, it is necessary that this even distribution of the liquid charge be accomplished without any substantial amount of the liquid hydrocarbons contacting the walls of the conversion chamber or other hot metal parts in the upper section of the conversion zone since, on contacting heated metal liquid hydrocarbons undergo very rapid conversion and deposit coke on said metal parts. This coke builds up and breaks off in large pieces which plug up the restricted passages for contact material flow in the lower section of the conversion chamber and at other points in the cyclic system.

When the liquid charge is sprayed into the conversion chamber there is the further difficulty that some of the liquid becomes atomized and forms a fog of finely divided liquid droplets which remains suspended above the surface of the contact material column until said fog contacts the hot metal parts in the upper section of the conversion zone and conversion of the liquid with resultant coke deposition takes place. The invention described herein avoids the use of the spray required for other systems of liquid hydrocarbon charging and introduces the liquid as a low velocity, non-atomized stream to avoid the difficulties mentioned hereinabove.

A major object of this invention is the provision of an improved method and apparatus for the introduction of particle-form, solid contact material and liquid hydrocarbon charge into a hydrocarbon conversion zone.

A specific object of this invention is the provision in a hydrocarbon conversion process wherein a liquid hydrocarbon charge is passed downwardly within a substantially compact downwardly moving column of contact material particles of a method and apparatus permitting the uniform distribution of the liquid hydrocarbon charge over the surface of the contact material in the conversion zone but avoiding the formation of excessive coky deposits on the metal parts in said conversion zone.

These and other objects of this invention will become apparent from the following discussion of the invention.

Before proceeding with this discussion certain terms used in describing and in claiming this invention will be defined. The term "gaseous" as used here refers to a material in the gaseous phase under the particular operating conditions of temperature and pressure involved regardless of what may be the normal phase of the material under ordinary atmospheric conditions. Similarly the term "liquid" refers to a material in the liquid phase under the particular conditions involved regardless of its normal state. The expression "contact material" is employed herein in a broad sense as covering solid particles which are suitable as a contact or heat carrying agent regardless of whether such solid particles exhibit a catalytic effect toward the conversion or not. The term "inclined surface" is used here to include not only plane surfaces which form an acute angle with the horizontal but also curved surfaces whose tangents make an acute angle with the horizontal. The term "freely falling" as applied to a contact material stream is used herein to describe an unthrottled stream of contact material falling under the influence of gravity and retarded only by friction.

This invention may best be understood by reference to the drawings attached hereto of which Figure 1 is an elevational view showing the general arrangement of a continuous hydrocarbon conversion system of the type to which this invention may be applied; Figure 2 is an elevational view, partially in section, showing the application of this invention to the conversion vessel; and Figures 3, 4, 5 and 6 are elevational views, partially in section, showing the application of various modifications of this invention to the upper section of the conversion chamber. All of these drawings are highly diagrammatic in form.

Referring now to Figure 1 there is shown a conversion vessel 10 which is supplied with contact material through gravity feed leg 12 from a supply hopper 11. Converter 10 is provided with a contact material drain 13 bearing a flow control valve 14 at its lower end. Also shown is a reconditioner 15 having a contact material feed conduit 16 at its upper end and a contact material drain conduit 20 connected into its lower end. Contact material is transferred between the reconditioner and converter by means of conveyors 17 and 18. These conveyors may be of any suitable construction adapted to transfer hot contact material particles without severe breakage or attrition of the particles, for example continuous bucket elevators or gas lifts. In operation hot contact material at a temperature suitable for the hydrocarbon conversion is passed from hopper 11 through feed leg 12 into the upper end of vessel 10. Used contact material is withdrawn from the bottom of vessel 10 through conduit 13 at a rate, controlled by valve 14, which is in conformance with the requirements of the particular conversion operation involved. Used contact material is transferred to the upper end of reconditioner 15 by means of conveyor 17. In such processes as the catalytic cracking conversion of hydrocarbons, a substantial amount of carbonaceous contaminant is deposited upon the used contact material in which case reconditioner 15 takes the form of a catalyst regenerator. Air is introduced into the lower section of vessel 15 through conduit 21 and is permitted to pass upwardly through the column of used contact material within vessel 15 to burn off the contaminant. Flue gas is withdrawn from the upper section of vessel 15 through conduit 22. In order to remove sufficient heat from the regenerating catalyst to prevent over-heating of the catalyst to heat damaging levels, cooling tubes (not shown) may be provided within the reconditioner. These tubes may be supplied with a suitable cooling fluid through pipe 23. Cooling fluid may be withdrawn from the cooling tubes by means of pipe 24. Other regenerator constructions than that shown above are contemplated within the scope of this invention. If the process involved is a strictly non-catalytic process, for example in which the amount of carbonaceous contaminant deposited on the contact material is negligible, or if it be a process wherein the amount of carbonaceous contaminant deposited on the contact material be insufficient upon combustion to heat the contact material to the desired inlet temperature to the converter, the reconditioner 15 may take the form of an apparatus the principal function of which is to heat the contact material. Considering again the converter 10, high boiling liquid hydrocarbons from a suitable charge preparation system 19 are supplied in heated condition into the upper section of vessel 10 by means of conduit 25. Vaporized hydrocarbons may be simultaneously supplied to the upper section of converter 10 through conduit 26. Converted gaseous hydrocarbon products which may contain high percentages of gasoline and fuel oils are withdrawn from the lower section of the converter and passed through conduit 27 to a suitable product fractionator and recovery system 28. An inert purge gas such as steam or flue gas may be introduced into the contact material column within the lower section of vessel 10 through conduit 29 for the purpose of stripping gaseous hydrocarbon products from the outflowing used contact material. An inert seal gas such as steam or flue gas may be introduced into the upper end of vessel 10 through conduit 30 at a rate so controlled by diaphragm valve 31 and differential pressure controller 32 as to maintain an inert gaseous pressure adjacent to the lower end of contact material feed leg 12, above the gaseous pressure in the hydrocarbon conversion zone. In this manner the escape of hydrocarbons through the contact material feed system is prevented.

In Figure 2, details of the construction of converter 10 are shown and like members in both Figures 1 and 2 bear the same numerals. Looking now at Figure 2 it will be seen that a partition 33 extends transversely across the upper section of vessel 10 to divide it into a seal chamber 34 positioned at the upper end of vessel 10 and a conversion chamber 35 positioned therebelow. Depending downwardly from partition 33 is a plurality of horizontally spaced apart conduits 36 which terminate at a fixed height within conversion chamber 35 so as to maintain a substantially compact bed of contact material 38 below the termination point of said conduits. Also depending downwardly from partition 33 centrally and vertically is conduit 37 which terminates within conversion chamber 35 above contact material bed 38. Attached to the lower end of passageway 37 is orifice plate 39 having orifice 40 at its center. Hydrocarbon charge conduit 25 extends through the wall of vessel 10 a substantial vertical distance below orifice 40 and terminates on the center-line of orifice 40. Attached to the end of conduit 25 within vessel 10 is vertical conduit 43 which terminates a vertical distance below orifice 40. A symmetrical upwardly tapered baffle is also fixed below orifice 40. This baffle consists of two parts, The first, 41, terminating in an apex is fixed between orifice 40 and the upper end of conduit 43 by means of rods 42 and the second, 44, is attached at its upper end to conduit 43 in such a manner that a passageway 45 for liquid flow is formed between 41 and 44. This baffle with sections 41 and 44 may be of any desired horizontal cross-sectional shape such as circular, square, or hexagonal. For example, the upper portion 41 may be conical in form while the lower portion is frusto-conical in form with its upper base of smaller diameter than the base of cone 41. Alternatively the lower portion 44 may be also a cone with inlet pipe 43 extending through its apex. Alternatively the baffle below orifice 40 may merely take the form of a single cone with suitable orifices in its surface spaced around its periphery at one or more levels and with suitable means for feeding liquid charge to the orifices.

In operation an accumulation of contact material is maintained within seal chamber 34 which is replenished with contact material at a temperature suitable for the conversion by means of feed leg 12. Contact material is removed from the lower section of the seal zone by means of conduits 36 and passes downwardly onto the surface of contact material bed 38. These conduits, since they are throttled only by contact material column 38, serve to maintain the surface of column 38 at a fixed vertical level within conversion chamber 35. Contact material also gravitates downwardly through passageway 37 and is discharged from orifice 40 onto baffle section 41. Contact material passes over the downwardly sloping inclined surface of baffle sections 41 and 44 as a freely falling stream. Heated liquid hydrocarbon charge passes at a low velocity through conduits 25 and 43 and is injected into the underside of the contact material stream by means of passageway 45. Liquid charge and contact material pass downwardly together over the inclined surface of 44 so that they become thoroughly mixed and the liquid charge becomes sorbed on the contact material particles. It will be noted that the possibility for the formation of coky deposits on the metal parts in the upper section of the conversion zone is minimized by introducing the liquid hydrocarbon charge in this manner since liquid hydrocarbons are introduced to the conversion chamber as a low velocity stream and are not sprayed or atomized and since the introduction is made at a point well removed from hot metal parts such as conduits 36 and the walls of vessel 10. Further the contact material flowing down the inclined passage 41, 44 forms a blanket or contact material wall between the housing walls and the liquid feed supplied under the blanket or contact material stream. Thus the tendency for liquid to splatter or migrate towards the walls, characteristic of systems in which the liquid feed is sprayed onto the top surface of a flowing contact material stream instead of on the under surface thereof, is greatly reduced. Contact material particles mixed with liquid charge shower downwardly from baffle 44 onto the top of contact material column 38 and soon distribute themselves uniformly over the column cross-section in passing through the converter. If desired, vaporized hydrocarbons may also be introduced by means of conduit 26. The contact material particles and liquid charge and any vapors formed or introduced pass downwardly within the column so as to effect conversion of liquid charge to lower boiling gaseous products which are disengaged from the column in the lower section of vessel 10 and removed through 27. The gaseous products withdrawn at 27 may be disengaged from the column by any of a number of suitable arrangements such as that shown in Simpson et al., U. S. Patent No. 2,336,041, or troughs such as shown by Fahnestock in U. S. Patent No. 2,362,621. Used contact material is withdrawn from the lower end of vessel 10 through conduit 13. Baffles may be provided within the lower end of vessel 10 which are adapted to uniformly withdraw contact material from all sections of the horizontal cross-sectional area of the conversion zone. Such baffles are shown in Evans et al., U. S. Patent No. 2,412,136. The rate of contact material withdrawal is throttled by valve 14 so as to insure a column of contact material in vessel 10 thereabove and so as to control the residence time of contact material in the conversion zone as dictated by the particular operation involved.

Turning now to Figure 3 details of the construction of a modification of this invention are shown and like elements in Figures 2 and 3 bear the same numerals. Figure 3 is a cut away view of the central portion of partition 33 of Figure 2. Conduit 37, having orifice plate 39 with orifice 40, depends downwardly, centrally and vertically from partition 33 and terminates within the upper section of conversion zone 35 above the surface of the contact material column. A symmetrical, upwardly tapered baffle is fixed centrally beneath orifice 40. This baffle consists of an upper section 47 terminating in an apex directly beneath orifice 40 and a lower section 51 fixed a spaced distance below 47 so as to define a passage 50. This baffle may be of any desired horizontal cross-sectional shape such as circular, square or hexagonal and has sides concavely curved from apex to base as is shown in the vertical cross-section in Figure 3. Section 47 is supported from conduit 37 by means of rods 46 while section 51 is supported at its upper end by means of plate 50 which is of the same horizontal shape as 51 and which connects to conduit 43. Member 48 which is of the same horizontal cross-sectional shape as baffle section 47 closes off the base of 47 so that a manifold 57 is formed between members 48 and 49.

The operation of this modification of the invention is similar to the operation described in connection with Figure 2. Liquid hydrocarbon charge flows through conduits 25 and 43 into manifold 57 from which it is discharged as a low velocity, non-atomized stream through passage 50 into the under side of the contact material stream flowing over the inclined surface of the deflecting baffle formed by sections 47 and 51. The liquid oil charge is uniformly sorbed in the pores and/or deposited on the surface of the contact material particles which shower downwardly from the lower edge of 51 onto the column of contact material within the conversion zone. The concavity of baffles sections 47 and 51 in this modification reduces the tendency for contact material particles to strike the baffles and immediately bound away before said particles are thoroughly contacted with liquid hydrocarbon charge.

In processes wherein the conditions of operation make it necessary to employ conversion vessels of large cross-sectional area it may be desirable to introduce liquid hydrocarbon charge at a plurality of points within the horizontal cross-section of the conversion vessel. The upper section of such a conversion vessel is shown in Figure 4. Referring to Figure 4, three vertical conduits 37 depend downwardly from transverse partition 33 and terminate in the upper section of conversion zone 35. Each conduit 37 has fixed to its lower end an orifice plate 39 with orifice 40. Liquid hydrocarbon charge conduit 25 extends into the conversion zone and has depending upwardly from it at points centrally beneath orifices 40, three vertical nipples 52. A symmetrical upwardly tapered baffle 53 is attached to each nipple by means of a base plate 54 so that the apex of the baffle is fixed centrally beneath orifice 40. Each baffle is provided with a plurality of vertically spaced rows of spaced orifices 55. In operation contact material particles gravitate from seal chamber 34 through conduits 37 and orifices 40 onto baffle 53. Liquid hydrocarbon charge flows through conduit 25 and nipples 52 into manifolds 56 beneath baffles 53 and then onto the surface of baffles 53 by means of orifices 55. Contact material particles in passing over baffles 53 mix with liquid hydrocarbons and then shower downwardly onto the surface of contact material column 38.

If desired, a suitable mechanism which will provide for an opening of variable diameter at the end of conduit 37 may be substituted for orifice plate 39 in any of the species of this invention above described. Such a mechanism, actuated by an instrument measuring the height of the contact material column within the conversion zone, would make possible the elimination of contact material conduits 36 from the conversion zone. Hagerbaumer in U. S. Patent No. 2,458,162 describes a mechanism which accomplishes this end.

Figure 5 illustrates another modification of this invention applied to the upper section of the conversion vessel. In Figure 5 conduit 37 extends centrally and vertically from the lower section of seal chamber 34 into the upper section of conversion chamber 35. A symmetrical upwardly tapered baffle 57 terminating in an apex is fixed directly below conduit 37. A continuous passage 58 penetrates baffle 57 at a horizontal level a substantial vertical distance above the lower edge of baffle 57. Passage 58 is connected to manifold 59 which in turn connects to liquid hydrocarbon charge conduit 60. Directly below baffle 57 is funnel 61. This funnel is of similar horizontal cross-sectional shape to baffle 57 but is larger in horizontal cross-sectional area so that it will fit around the lower edge of baffle 57 and define space 62 between the lower edge of said baffle and the inside of the upper portion of funnel 61. Beneath funnel 61 is a second baffle 63 of similar construction to baffle 57 and having passage 64 a substantial vertical distance above its lower edge. Passage 64 connects to manifold 65 to which is connected liquid hydrocarbon charge conduit 66. A funnel 67 similar to funnel 61 is fixed below baffle 63 with its upper edge around and above the lower edge of baffle 63 so that a space 68 is defined between the lower edge of said baffle and the inner wall of said funnel.

Fixed below funnel 67 so that it may receive contact material from 67 is a receptacle 80. A plurality of conduits 69 for the transfer of contact material extend from the lower section of receptacle 80 to a plurality of points on the upper surface of contact material column 38.

In operation contact material is transferred from the lower section of seal zone 34 by means of conduit 37 onto the inclined surface of baffle 57. Contact material passes over baffle 57 as a compact stream and a low velocity, non-atomized stream of heated liquid hydrocarbon charge is injected into the under side of this compact stream through passage 58 which is supplied with liquid charge from manifold 59 and conduit 60. The liquid charge passes downwardly with the contact material over the inclined surface of baffle 57 and becomes sorbed on said contact material. Contact material with liquid charge sorbed thereon passes as a substantially compact stream from baffle 57, through funnel 61 and onto the surface of baffle 63. Contact material also passes over baffle 63 as a compact stream and a second low velocity, non-atomized stream of liquid charge is injected into the under side of this compact stream through passage 64. Liquid charge flows downwardly over baffle 63 with the compact stream of contact material and becomes sorbed on said contact material. The compact stream of contact material with liquid charge thereon is transferred from the lower edge of baffle 63 into receptacle 80 by means of funnel 67. Contact material gravitates from the lower section of receptacle 80 through conduits 69 onto the upper surface of contact material column 38. Baffles 57 and 63 should be fixed very closely underneath the outlet end of conduit 37 and funnel 61 respectively so that the stream of catalyst on said baffles does not become so thick that a large amount of the catalyst particles are not contacted by the injected liquid charge. Also it is desirable that the angle that the sides of baffles 57 and 63 make with the horizontal should be broadly between about 30° and 70° and preferably between 35° and 45° to avoid an excessively thick stream of catalyst near the outer edge of the baffles.

It should be noted that in this modification of the invention the contact material passes over the inclined surfaces of the baffles as a compact stream rather than as a freely falling stream in distinction with those examples of the invention previously described. This makes possible a longer contact time between contact material and liquid charge before they are delivered to the contact material column and insures complete sorption of the liquid charge on the contact material before this delivery.

A further modification of this invention as applied to the upper section of the conversion vessel is shown in Figure 6. In this modification a conduit for the transfer of contact material 37 extends from the lower section of seal chamber 34 into the upper section of conversion chamber 35. An orifice plate 39 with orifice 40 is attached to the lower end of conduit 37. A symmetrical, upwardly tapered baffle terminates in an apex directly beneath conduit 37. A passageway 71 for the flow of liquid charge is provided near the upper end of baffle 70. Connected to the under side of said passage is a manifold 72 which in turn connects to a liquid hydrocarbon charge conduit 73. A funnel 74, of horizontal cross-sectional shape the same as baffle 70 but of greater horizontal cross-sectional area than that of baffle 70 at its lower edge, is fixed below baffle 70 with its upper end extending above the lower edge of baffle 70 so as to define a space 75 for contact material flow. Beneath funnel 74 is fixed receptacle 76 which is designed to receive contact material from funnel 74 and to confine an accumulation of contact material. A plurality of conduits 77 for the transfer of contact material extend from the under side of receptacle 76 to a plurality of points on the upper surface of contact material column 38.

In operation contact material gravitates from seal zone 34 through conduits 37 and orifice 40 onto the apex of baffle 70. A portion of this contact material is confined by the upper edge of funnel 74 and flows downwardly over baffle 70 as a compact stream. The remaining portion of the contact material flows freely over this compact stream and showers over the upper edge of funnel 74 downwardly onto the upper surface of contact material column 38. Liquid hydrocarbon charge is injected into the under side of the compact stream on baffle 70 through passage 71 and passes downwardly with this compact stream over baffle 70 and becomes sorbed on the contact material in the compact stream. This compact contact material stream with liquid hydrocarbons sorbed on the contact material is transferred from the lower edge of baffle 70 through funnel 74 to an accumulation of contact material within receptacle 76. Contact material is transferred from the lower section of this accumulation to the surface of contact material column 38 by means of conduits 77. In this modification of the invention the upper end of funnel 74 should not extend above the lower edge of baffle 70 to such a height that the compact stream on the baffle is more than about 2 inches in thickness.

The exact dimensions of the various elements which combine to provide the improved apparatus of this invention will, of course, be dependent, to a certain extent, upon the particular operation and operating conditions involved. In general, however, it is desirable to adjust the relative sizes of orifice 40 and the baffle therebelow on which contact material particles and liquid hydrocarbon charge are contacted so that the contact material flow over the baffle will be less than 2 inches thick or less than 10 particles thick immediately adjacent to the lower edge of the baffle. The angle made by the sides of the baffle should be such as to insure a reasonably rapid rate of flow of contact material particles over said baffles while not maintaining such a rapid rate of flow that insufficient contact time is provided between said particles and liquid oil charge. Generally, an angle in the range about 30 to 70 degrees is satisfactory. The length of the inclined flow surface for contact material, i. e., the slant height in the case of a conical baffle should be from one to 10 feet and preferably from 2 to 7 feet. It is desirable to provide a vertical distance of about 2 to 10 feet between the lower edge of the baffle and the surface of contact material column 38. It is further desirable that, in operation, the baffle be substantially completely covered with contact material. The vertical length of column 38 may vary from 3 to 40 feet depending on the process. The velocity of the liquid stream injected should be between 0.2 and 20 ft./sec. and preferably between 0.5 and 10 ft./sec.

As an example of the application of this invention its use in the catalytic conversion of fluid hydrocarbons will be considered. A particle-form catalytic material is introduced to the seal chamber at a temperature in the range about 900° F. to 1200 F. The catalyst gravitates into the conversion zone through conduits 36 and 37, about 10 to 50 percent of the flow occurring in conduits 36. A liquid hydrocarbon charge which may consist principally of hydrocarbons boiling above the desired average conversion temperature is introduced through pipe 25. Such a charge may be a reduced petroleum crude which has been preheated to a temperature of the order of 600° F. to 800° F. A gas oil fraction which has been vaporized and heated to a temperature of the order of 800° F. to 950° F. may be introduced to the conversion chamber through conduit 26. Gaseous products containing high yields of gasoline may be withdrawn through conduit 27. In the regeneration zone air may be employed to burn from the catalyst the carbonaceous contaminant formed thereon in the conversion zone. Sufficient heat should be withdrawn from the catalyst during regeneration to prevent it from reaching a heat damaging temperature.

It should be understood that this invention covers all changes and modifications of the example of the invention herein chosen for purposes of disclosure which do not constitute departures from the spirit and scope of the invention.

I claim:

1. A method for the conversion of liquid hydrocarbons in the presence of a moving contact material which comprises: gravitating a stream of particle-form contact material at a temperature suitable for conversion downwardly over an inclined surface, supplying liquid hydrocarbon charge as a low velocity non-atomized stream to the under side of said contact material stream so that contact material particles and liquid charge are mixed as they pass downwardly over said surface, passing the mixed liquid charge and contact material to a substantially compact bed of contact material maintained within a confined conversion zone, passing contact material and liquid charge downwardly through said bed to effect the conversion of said liquid charge, and removing the products of said conversion from said conversion zone.

2. A method for the conversion of high boiling liquid hydrocarbons to lower boiling gaseous hydrocarbons in the presence of a moving particle-form contact material mass which method comprises: maintaining a compact column of contact material within a lower portion of a confined conversion zone, maintaining a gas space in the upper section of said conversion zone above said column, introducing contact material into the upper section of said conversion zone by means of a confined passage, discharging contact material from said passage onto a downwardly sloping surface so that contact material passes as a stream over said surface, said contact material stream substantially completely covering said surface, discharging hydrocarbon charge into the under side of said contact material stream as a low velocity non-atomized liquid stream at a point above the lower edge of said surface so that said liquid and said contact material are thoroughly mixed as they pass downwardly together over said surface, passing mixed contact material and liquid charge from the lower edge of said surface through said gas space onto said compact column, passing said liquid charge and said contact material downwardly through said column to effect the desired conversion of said liquid hydrocarbons to lower boiling gaseous hydrocarbons, withdrawing said lower boiling gaseous hydrocarbons from said conversion zone separately of the contact material, and withdrawing contact material from the lower section of said conversion zone.

3. A process for the conversion of high boiling liquid hydrocarbons to lower boiling gaseous hydrocarbon products in the presence of a compact moving column of particle-form contact material which process comprises: introducing contact material at a temperature suitable for the conversion into the upper section of a confined conversion zone by means of a confined passage, discharging contact material from said passage onto an inclined surface, passing contact material downwardly over said surface as a substantially compact stream, injecting a low velocity, non-atomized stream of liquid hydrocarbon charge into the underside of said compact contact material stream at a point above the lower edge of said surface so that liquid hydrocarbons will pass downwardly over said surface together with the contact material and become sorbed on said contact material, passing said compact stream with liquid charge thereon from said inclined surface to the upper surface of a substantially compact column of contact material maintained within the conversion zone, passing the liquid charge downwardly through the column to effect the desired conversion to lower boiling gaseous hydrocarbon products, and withdrawing said products from the conversion zone separately of the contact material.

4. A method for converting high boiling liquid hydrocarbons to lower boiling gaseous hydrocarbons in the presence of a compact moving column of particle-form contact material which comprises: maintaining a substantially compact column of contact material throughout the lower portion of a confined, elongated conversion zone, causing said contact material in said column to move downwardly by withdrawing used contact material at a controlled rate from the lower section of said conversion zone, replenishing said column by directing contact material at a suitable conversion temperature from at least one substantially confined passage directly onto the surface of said column, also separately introducing contact material into the upper section of said conversion zone by means of a confined passage which directs contact material onto an inclined surface terminating a substantial distance above the surface of the contact material column so that a freely falling stream of contact material particles passes over said inclined surface and substantially completely covers said surface, injecting liquid hydrocarbon charge as a low velocity non-atomized stream into the under side of said contact material stream at at least one point substantially above the lower end of said surface whereby liquid hydrocarbons and contact material pass downwardly together over said surface and liquid hydrocarbons become substantially completely sorbed on the contact material, showering contact material with liquid hydrocarbons sorbed thereon downwardly from the lower edge of said inclined surface through the upper portion of said conversion zone onto the upper surface of said contact material column, passing said liquid hydrocarbons downwardly through said column to effect the desired conversion to lower boiling gaseous hydrocarbons and removing said lower boiling gaseous hydrocarbons from conversion zone separately of the contact material.

5. A process for the conversion of high boiling liquid hydrocarbons to lower boiling gaseous hydrocarbon products in the presence of a compact moving column of particle-form contact material which process comprises: introducing particle-form contact material at a temperature suitable for the hydrocarbon conversion into the upper section of a confined, elongated conversion zone, passing said contact material as a substantially compact stream over an inclined surface maintained within the upper section of said conversion zone, said stream substantially completely covering said surface, injecting a low velocity, non-atomized stream of liquid hydrocarbon charge into the under side of said stream on said surface at a point substantially above the lower edge of said surface so that liquid charge will pass downwardly together with the contact material over said surface and become sorbed on the contact material, passing contact material from the lower edge of said inclined surface onto a second inclined surface, passing contact material over said second surface as a compact stream, injecting a low velocity, non-atomized stream of liquid charge into the under side of said contact material stream on said second surface so that the liquid charge will pass downwardly over said second surface and become sorbed on the contact material on said second surface, passing contact material with liquid charge sorbed thereon from said second surface to a substantially compact accumulation of contact material maintained below said second surface, passing contact material with liquid charge sorbed thereon from the lower section of said accumulation as a plurality of compact streams to a plurality of points uniformly distributed on the upper surface of a substantially compact column of contact material maintained in the conversion zone below said accumulation, passing the hydrocarbons downwardly through said column to effect the desired conversion to lower boiling gaseous hydrocarbon products, and removing said gaseous products from the conversion zone separately of the contact material.

6. A process for the conversion of high boiling liquid hydrocarbons to lower boiling gaseous hydrocarbon products in the presence of a compact moving column of particle-form contact material which process comprises: maintaining a substantially compact column of particle-form contact material within the lower section of a confined, elongated conversion zone, gravitating contact material into the upper section of said conversion zone through a laterally confined passage, discharging contact material from the said passage onto an inclined surface within the upper section of said conversion zone, passing a portion of said contact material downwardly over said inclined surface as a substantially compact stream, passing the remaining portion of said contact material downwardly as a freely falling stream over the upper side of said compact stream, injecting a low velocity, non-atomized stream of liquid hydrocarbon charge into the under side of said compact contact material stream at a point substantially above the lower edge of said surface so that liquid charge will pass downwardly over said surface together with the contact material particles and become sorbed thereon, passing said compact stream with liquid charge sorbed thereon to a substantially compact accumulation of contact material below said surface, passing contact material from the lower section of said accumulation as a plurality of compact streams to a plurality of points on the upper surface of said column, showering said freely falling contact material stream from said surface downwardly onto the upper surface of said column, passing liquid hydrocarbon charge downwardly through said column to effect the desired conversion to lower boiling gaseous products, removing said products from the conversion zone separately of the contact material, and removing contact material from the lower section of said conversion zone.

7. A process for the conversion of high boiling liquid hydrocarbons to lower boiling gaseous hydrocarbon products in the presence of a moving compact column of particle-form contact material which process comprises: passing a stream of contact material at a temperature suitable for the conversion over a surface inclined at an angle between 30 and 70 degrees with the horizontal in such a manner that said stream substantially covers said surface and is less than 10 particles thick at the lower edge of said surface, injecting a non-atomized stream of liquid charge at a velocity within the range 0.2 to 20 feet per second into the under side of said contact material stream on said surface at a point substantially above the lower edge of said surface whereby the liquid charge and contact material will pass downwardly together over said surface and liquid charge will become substantially completely sorbed on said contact material particles, passing contact material particles with liquid charge sorbed thereon to a compact column of contact material maintained within a confined conversion zone, passing liquid charge downwardly through said column to effect the conversion of said charge to lower boiling gaseous products and removing said gaseous products from said conversion zone separately of the contact material.

8. A process for the conversion of high boiling liquid hydrocarbons to lower boiling hydrocarbons in the presence of a compact moving column of particle-form contact material which process comprises: gravitating contact material at a temperature suitable for the conversion into a confined conversion zone through a confined passage, discharging the contact material from the lower end of said passage onto an inclined surface maintained therebelow so that the contact material will pass as a stream of particles over said surface, injecting a low velocity non-atomized stream of high boiling liquid hydrocarbons into the under side of said contact material stream at a plurality of vertically spaced apart levels along said surface so that liquid hydrocarbons will mix with the contact material and become sorbed thereon, showering contact material with liquid hydrocarbons sorbed thereon from the lower edge of said surface onto the upper surface of a compact column of contact material maintained a vertical distance therebelow, passing liquid hydrocarbons and contact material downwardly together through said column to effect the conversion of said liquid hydrocarbons to lower boiling hydrocarbons, removing said lower boiling hydrocarbons from said conversion zone separately of said contact material, and removing used contact material from the lower section of said conversion zone.

9. An apparatus for the conversion of high boiling liquid hydrocarbons to lower boiling hydrocarbons in the presence of a moving contact material mass which apparatus comprises in combination: a baffle providing an inclined side, a conduit terminating on a downwardly facing outlet above the upper section of said inclined side, said conduit being substantially less in horizontal cross-sectional area than the area of the projection of said inclined side on a horizontal plane, means for supplying contact material to the upper section of said conduit whereby contact material will flow through said conduit onto the upper surface of said inclined side and contact material will pass downwardly as a stream over said inclined side, means for injecting liquid hydrocarbon charge into the under side of said stream on said inclined side as a low velocity non-atomized stream, means defining a conversion chamber adapted to receive contact material and liquid hydrocarbons from said baffle and adapted to confine a substantially compact bed of contact material, and means for withdrawing lower boiling hydrocarbon products from said chamber substantially separately of the contact material.

10. An apparatus for the conversion of high boiling liquid hydrocarbons to lower boiling hydrocarbons in the presence of a moving contact material mass which comprises in combination: means defining a confined conversion chamber adapted to confine a compact bed of particle-form contact material, a conduit extending downwardly into the upper section of said chamber for the supply of contact material, means for supplying contact material to the upper end of said conduit, a baffle having a side making an acute angle with the horizontal fixed directly below said conduit, the projection of said side on a horizontal plane having a greater area than the horizontal cross-sectional area of the outlet of said conduit so that contact material will pass as a stream over said side of said baffle, means for discharging liquid hydrocarbon charge as a low velocity non-atomized stream into the under side of said contact material stream on said baffle, and means to withdraw hydrocarbon products from said chamber separately of said contact material.

11. An apparatus for the conversion of high boiling liquid hydrocarbons to lower boiling gaseous hydrocarbons in the presence of a compact moving column of particle-form contact material which comprises in combination: a confined elongated conversion chamber adapted to confine a compact column of contact material therein, a confined passageway extending downwardly into said conversion chamber and terminating within its upper end, means for supplying granular contact material to the upper end of said passageway, an upwardly tapered symmetrical baffle terminating in an apex located vertically directly below the lower end of said passageway and being provided with a horizontally continuous opening at a vertical level intermediate between the apex and its lower edge, the projection of said baffle on a horizontal plane having a greater area than the horizontal cross-sectional area of the outlet of said passageway, a liquid hydrocarbon charge conduit extending into the conversion chamber from the exterior and connected at its open discharge end to a manifold which in turn connects to said opening, means for maintaining the surface level of said compact column a vertical distance below the lower edge of said baffle, means for withdrawing hydrocarbon products from said conversion chamber, and means for removing used contact material from the lower section of said conversion chamber.

12. An apparatus for the conversion of high boiling liquid hydrocarbons to lower boiling gaseous hydrocarbons in the presence of a moving compact column of particle-form contact material which comprises in combination: means defining a conversion chamber adapted to confine a substantially compact column of contact material, a conduit extending downwardly into the upper section of said chamber for the supply of contact material, means for supplying contact material to the upper section of said conduit, a symmetrical upwardly tapered baffle having upwardly concave curved sides and terminating in an apex a spaced distance vertically directly below said conduit and being provided at a point a vertical distance above the lower edge of said baffle with a horizontally continuous passageway, the projection of said baffle on a horizontal plane having a greater area than the horizontal cross-sectional area of the outlet of said conduit, a liquid discharge conduit which extends into the conversion chamber from the exterior and terminates at its discharge end in a manifold which connects to said passageway, means for maintaining said compact column a vertical distance below the lower edge of said baffle, means for removing gaseous hydrocarbon products from said conversion chamber and means for removing used contact material from the lower section of said chamber.

13. An apparatus for the conversion of high boiling liquid hydrocarbons to lower boiling gaseous hydrocarbons in the presence of a compact moving column of particle-form contact material which comprises in combination: a conversion chamber adapted to confine a compact column of contact material, a conduit for the supply of contact material extending downwardly into the upper section of said conversion chamber, means for supplying particle form contact material to the upper section of said conduit, an upwardly tapered symmetrical baffle terminating in an apex fixed directly beneath said conduit, the projection of said baffle on a horizontal plane having a greater area than the horizontal cross-sectional area of the outlet of said conduit, a manifold beneath said baffle, a plurality of passageways from said manifold through the surface of said baffle, said passageways being at a plurality of vertical levels on said baffle, a liquid hydrocarbon charge conduit connecting into said manifold, means for maintaining the surface level of said compact column a vertical distance below the lower edge of said baffle, means for removing gaseous products from said conversion chamber, and means for removing used contact material from said conversion chamber.

14. An apparatus for the conversion of high boiling liquid hydrocarbons to lower boiling gaseous hydrocarbon products in the presence of a compact moving column of particle-form contact material which comprises in combination: a substantially vertical, elongated conversion chamber adapted to confine a substantially compact column of particle-form contact material, a substantially vertical passageway for the passage of contact material extending substantially vertically into the upper section of said conversion chamber, means for supplying contact material to the upper end of said passageway, a symmetrical upwardly tapered baffle terminating in an apex directly beneath said passageway and adapted to receive contact material from said passageway on its upper surface, the projection of said baffle on a horizontal plane having a greater area than the horizontal cross-sectional area of the outlet of said passageway, a funnel similar in horizontal cross-sectional shape to said baffle but of greater horizontal cross-sectional area than the lower edge of said baffle, the upper end of said funnel being fixed about the lower edge of said baffle and extending above the lower edge of said baffle so as to receive contact material from said baffle and so as to confine a portion of the contact material on said baffle as a compact stream while the remaining portion of said contact material on said baffle passes freely over said compact stream and over the outer edge of said funnel and showers downwardly onto the upper surface of said contact material column, means for injecting a low velocity, non-atomized stream of liquid hydrocarbon charge into the under side of said compact stream at a point substantially above the lower edge of said baffle, a receptacle fixed below said funnel adapted to receive contact material from said funnel and to confine an accumulation of said contact material, a plurality of conduits for the transfer of contact material extending from the lower section of said receptacle to a plurality of points on the upper surface of said compact column, and means for removing gaseous products from the lower section of said conversion chamber.

15. An apparatus for the conversion of high boiling liquid hydrocarbons to lower boiling gaseous hydrocarbon products in the presence of a substantially compact moving column of particle-form contact material which comprises in combination: an upright, elongated conversion chamber adapted to confine a compact column of particle-form contact material, a substantially vertical conduit for the passage of contact material extending substantially vertically into the upper section of said conversion chamber, means for supplying contact material to the upper end of said conduit, a series of spaced alternate upwardly tapered baffles and funnels positioned below said conduit, the uppermost of said baffles and funnels being positioned to receive contact material discharging from said conduit and said baffles being positioned so as to direct the flow of contact material into the funnel next below and said funnels being positioned to direct contact material onto the apex of the baffle next below, the projection of the uppermost of said baffles on a horizontal plane having an area greater than the area of the outlet of said conduit, a receptacle adapted to receive contact material from the lowermost funnel and to confine an accumulation of contact material, a plurality of conduits extending from the lower section of said receptacle to a plurality of points on the upper surface of said contact material column, means for directing a low velocity, non-atomized stream of liquid charge outwardly from the upper surface of each baffle and into the contact material on each baffle, and means for removing gaseous hydrocarbons from the lower section of said conversion chamber.

References Cited in the file of this patent

UNITED STATES PATENTS

| | | |
|---|---|---|
| 2,438,261 | Utterback | Mar. 23, 1948 |
| 2,548,912 | Savage | Apr. 17, 1951 |
| 2,561,420 | Schutte | July 24, 1951 |
| 2,574,503 | Simpson | Nov. 13, 1951 |
| 2,687,372 | Ray | Aug. 24, 1954 |